United States Patent
Christian et al.

(10) Patent No.: US 6,740,451 B2
(45) Date of Patent: May 25, 2004

(54) GOLD ADDITIVE FOR A CATHODE INCLUDING NICKEL OXYHYDROXIDE FOR AN ALKALINE BATTERY

(75) Inventors: Paul A. Christian, Norton, MA (US); Stuart M. Davis, Norfolk, MA (US); Tatjana Mezini, Medford, MA (US)

(73) Assignee: The Gillette Company, Boston, MA (US)

( * ) Notice: Subject to any disclaimer, the term of this patent is extended or adjusted under 35 U.S.C. 154(b) by 256 days.

(21) Appl. No.: 10/022,272

(22) Filed: Dec. 20, 2001

(65) Prior Publication Data

US 2003/0134199 A1 Jul. 17, 2003

(51) Int. Cl.[7] .................................................. H01M 4/62
(52) U.S. Cl. ........................ 429/223; 429/233; 29/623.1
(58) Field of Search .................. 429/223, 233, 429/623.1; 29/623.1

(56) References Cited

U.S. PATENT DOCUMENTS

| | | | |
|---|---|---|---|
| 3,853,623 A | 12/1974 | Davis | |
| 3,899,350 A | 8/1975 | Jackovitz et al. | |
| 3,911,094 A | 10/1975 | Megahed et al. | |
| 4,074,030 A | 2/1978 | Ruben | |
| 4,078,127 A | 3/1978 | Megahed et al. | |
| 4,224,392 A | 9/1980 | Oswin | |

(List continued on next page.)

FOREIGN PATENT DOCUMENTS

| | | | | |
|---|---|---|---|---|
| EP | 883198 A1 | * | 12/1998 | ............ H01M/4/32 |
| EP | 932211 A1 | * | 7/1999 | ............ H01M/4/52 |
| EP | 1 103 526 | | 5/2001 | |
| EP | 1 148 029 | | 10/2001 | |
| GB | 1124299 | | 8/1968 | |
| JP | 48-2384 | | 1/1973 | |
| JP | 56-145668 | | 11/1981 | |
| JP | 60143569 A | | 6/1985 | |
| JP | 61-158667 | | 6/1986 | |
| JP | 6318751 A | | 8/1988 | |
| JP | 01059766 A | | 3/1989 | |
| JP | 03055758 A | | 3/1991 | |
| JP | 04366553 A | | 12/1992 | |
| JP | 06260166 A | * | 9/1994 | ............ H01M/4/32 |
| JP | 08329937 A | * | 12/1996 | ............ H01M/4/32 |
| JP | 2001202956 A | * | 7/2001 | ............ H01M/4/52 |
| SU | 339995 | | 6/1972 | |
| WO | WO 00/14818 | | 3/2000 | |
| WO | WO 00/21151 | | 4/2000 | |

OTHER PUBLICATIONS

Hayashi et al., U.S. patent application Publication, Pub. No. U.S. 2001/0044050, Published Nov. 22, 2001.

Ohta et al., U.S. patent application Publication, Pub. No. U.S. 2001/0018148, Published Aug. 30, 2001.

Takagishi, H. et al., "Alkaline Manganese Battery: Characteristics of the Electrode Which Uses a Mixture of Oxides Consisting Mainly of Manganese Dioxide," Manganese Dioxide Symposium, vol. 2, pp. 486–496, (1980).

Takeda, K. et al., "Optimization of the Amount of Additives to AgO Cathodes on High–Drain Pulse Performance of Zn/AgO Cells," Journal of The Electrochemical Society, 148 (1), pp. A44–A48, (2001).

Megahed, S. A. et al., "Stable γNiOOH/Zn Button Cells for Electronic Applications," Progress in Batteries and Solar Cells, vol. 3, pp. 54–57, (1980).

Megahed, S. A. et al., "Sealed Nickel–Zinc Cells Using Stable Nickelic Oxyhydroxide Depolarizer," Proceedings of the Symposium on Battery Design and Optimization, The Electrochemical Society, Inc., S. Gross, Ed., vol. 79, No. 1, pp. 259–282, (1979).

*Primary Examiner*—Gregg Cantelmo
(74) *Attorney, Agent, or Firm*—Fish & Richardson P.C.

(57) ABSTRACT

An alkaline battery includes a cathode including a gold salt, an anode including zinc, a separator between the cathode and the anode, and an alkaline electrolyte.

44 Claims, 2 Drawing Sheets

U.S. PATENT DOCUMENTS

| | | |
|---|---|---|
| 4,546,058 A | 10/1985 | Charkey et al. |
| 4,605,604 A | 8/1986 | Pollack et al. |
| 4,663,256 A | 5/1987 | Corrigan |
| 4,844,948 A | 7/1989 | Nakahori et al. |
| 5,336,276 A | 8/1994 | Pensabene et al. |
| 5,348,822 A | 9/1994 | Ovshinsky et al. |
| 5,453,336 A | 9/1995 | Adler et al. |
| 5,494,763 A | 2/1996 | Behl et al. |
| 5,508,121 A | 4/1996 | Sawa |
| 5,514,497 A | 5/1996 | Furukawa |
| 5,567,549 A | 10/1996 | Ovshinksy et al. |
| 5,569,562 A | 10/1996 | Glemser et al. |
| 5,620,813 A | 4/1997 | Lee et al. |
| 5,691,086 A | 11/1997 | Baba et al. |
| 5,744,259 A | 4/1998 | Ohta et al. |
| 5,744,266 A | 4/1998 | Nunome et al. |
| 5,759,718 A | 6/1998 | Yao et al. |
| 5,928,714 A | 7/1999 | Nunome et al. |
| 5,948,564 A | 9/1999 | Ovshinsky et al. |
| 5,958,621 A | 9/1999 | Kao |
| 6,007,946 A | 12/1999 | Yano et al. |
| 6,013,390 A | 1/2000 | Kimiya et al. |
| 6,020,088 A | 2/2000 | Singh |
| 6,027,834 A * | 2/2000 | Hayashi et al. .............. 429/223 |
| 6,042,753 A | 3/2000 | Izumi et al. |
| 6,083,642 A | 7/2000 | Kato et al. |
| 6,162,561 A | 12/2000 | Wang et al. |
| 6,177,213 B1 | 1/2001 | Fetcenko et al. |
| 6,225,004 B1 | 5/2001 | Hayashi |
| 6,248,478 B1 * | 6/2001 | Friend et al. ............ 429/231.8 |
| 6,261,720 B1 | 7/2001 | Kimiya et al. |
| 6,265,105 B1 | 7/2001 | Tokuda et al. |

* cited by examiner

GOLD ADDITIVE FOR A CATHODE INCLUDING NICKEL OXYHYDROXIDE FOR AN ALKALINE BATTERY

TECHNICAL FIELD

This invention relates to batteries.

BACKGROUND

Batteries, such as alkaline batteries, are commonly used as energy sources. Generally, alkaline batteries have a cathode, an anode, a separator and an alkaline electrolyte solution. The cathode can include a cathode material (e.g., nickel oxyhydroxide), carbon particles that enhance the conductivity of the cathode, and a binder. The anode can be formed of a gel including zinc particles. The separator is disposed between the cathode and the anode. The alkaline electrolyte solution, which is dispersed throughout the battery, can be a hydroxide solution such as potassium hydroxide.

Undesirable capacity loss in batteries can be caused by corrosion of battery cans and/or self-discharge of the anode or cathode. For example, in an alkaline battery containing a gelled zinc anode and a nickel oxyhydroxide cathode, self-discharge at the anode can involve reduction of water (which leads to hydrogen gas evolution) and at the cathode can involve oxidation of water (which leads to oxygen gas evolution), respectively. These self-discharging reactions can greatly decrease cell discharge capacity, especially during storage. Having excellent capacity retention during storage can be an important feature of batteries, especially for primary batteries, which are not designed to be rechargeable.

SUMMARY

An alkaline battery has a cathode containing a gold salt. Such an alkaline battery exhibits excellent high power performance, as well as excellent capacity retention, especially during storage, for example, at high temperature.

In one aspect, an alkaline battery includes a cathode containing nickel oxyhydroxide and a gold salt, an anode, a separator between the anode and the cathode, and an alkaline electrolyte. The anode includes zinc.

The nickel oxyhydroxide can include gamma-nickel oxyhydroxide (e.g., non-fractured spherical gamma-nickel oxyhydroxide). The nickel oxyhydroxide can include beta-nickel oxyhydroxide, which can include non-fractured spherical particles. The nickel oxyhydroxide can be cobalt oxyhydroxide-modified nickel oxyhydroxide (e.g., cobalt oxyhydroxide-coated gamma-nickel oxyhydroxide). The nickel oxyhydroxide can be derived from alpha-nickel hydroxide or beta-nickel hydroxide, which can include non-fractured spherical particles. The beta-nickel oxyhydroxide can be derived from a beta-nickel hydroxide precursor, which can include non-fractured, substantially spherical particles. The nickel hydroxide can be a cobalt hydroxide-modified nickel hydroxide (e.g., cobalt hydroxide-coated nickel hydroxide).

The gold salt can be gold (+3) oxide, gold (+3) sulfide, gold (+3) hydroxide, or gold (+3) acetate. The cathode can include less than 1000 ppm, for example, between 5 ppm and 1000 ppm, between 10 ppm and 200 ppm, or between 15 and 100 ppm, of a gold salt.

The cathode can include an oxidizing additive that is more strongly oxidizing than nickel oxyhydroxide. Examples of such an oxidizing additive include NaOCl, $Na_2S_2O_8$, $K_2S_2O_8$, $KMnO_4$, $BaMnO_4$, $BaFeO_4$, $AgMnO_4$ or AgO.

The cathode can be housed in a can coated on an inside surface with graphite, titanium nitride, titanium oxynitride, or gold. The coating can be a thin layer. The layer thickness can range from 5 to 25 microns.

The anode can include a gelling agent, zinc particles, and, optionally, minor amounts of other additives, such as a gassing inhibitor.

The alkaline battery can be a primary battery.

The capacity loss of the alkaline battery having a cathode including the gold salt can be less than 30%, less than 20%, or less than 10% after storing the battery at 60° C. for 4 weeks.

In another aspect, a method of manufacturing an alkaline battery including a cathode containing nickel oxyhydroxide and a gold salt, an anode, a separator between the anode and the cathode, and an alkaline electrolyte includes obtaining the cathode, and assembling the cathode, the anode, and the separator between the cathode and the anode to form the alkaline battery. The cathode mixture includes nickel oxyhydroxide, a gold salt, conductive carbon and an alkaline electrolyte. The anode includes zinc. The cathode mixture can be prepared by adding an aqueous alkaline solution containing the alkaline electrolyte and a gold salt to an admixture of nickel oxyhydroxide and conductive carbon. The admixture can be prepared by dry mixing powders of nickel oxyhydroxide and conductive carbon.

Other features and advantages of the invention will be apparent from the description and drawings, and from the claims.

DETAILED DESCRIPTION

Figure 1:
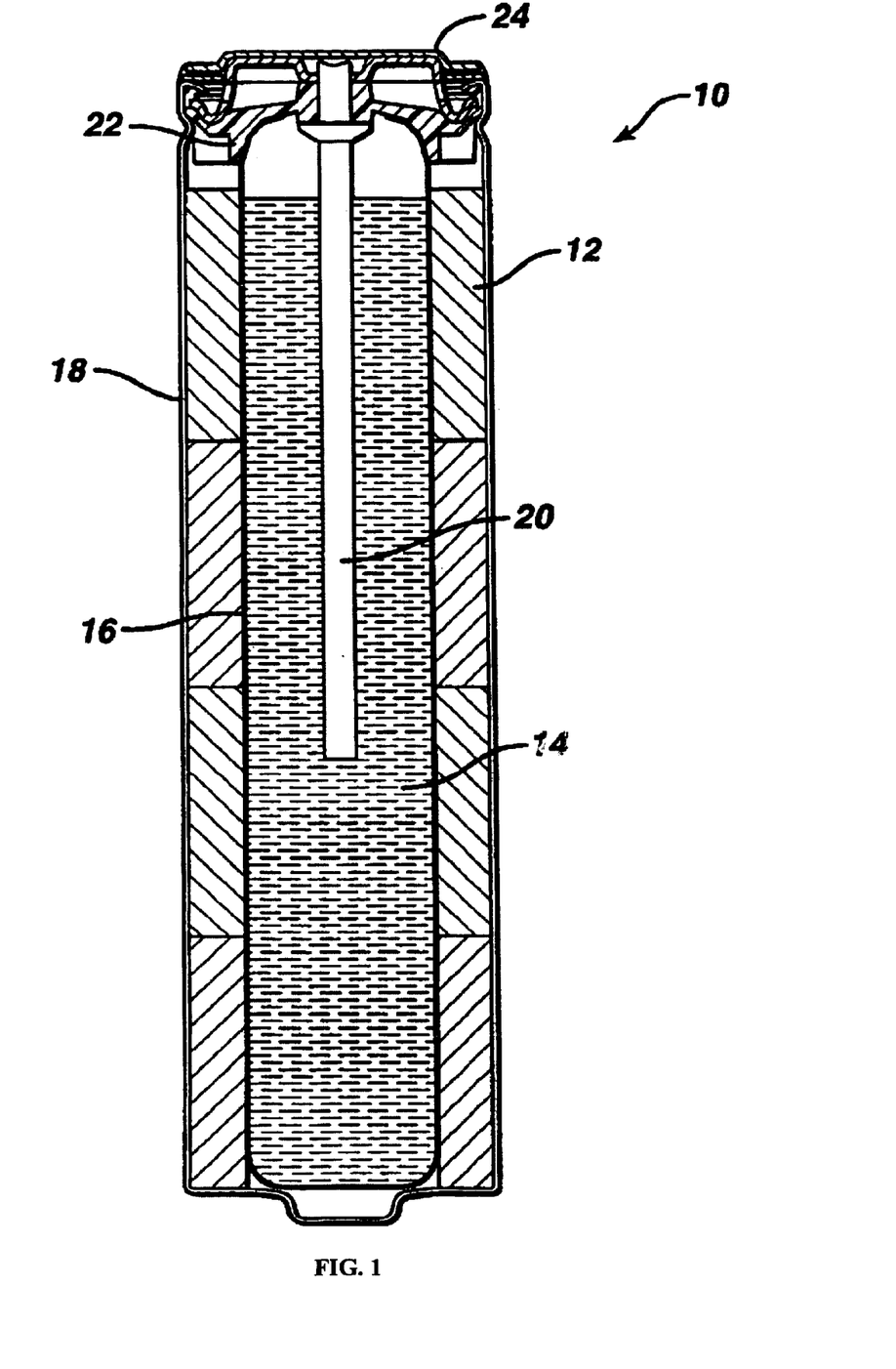
FIG. 1 is a cross-section view of a battery.

Referring to the FIG. 1, battery 10 includes a cathode 12, an anode 14, a separator 16 and a cylindrical housing 18. Battery 10 also includes current collector 20, seal 22, and a negative metal top cap 24, which serves as the negative terminal for the battery. The cathode is in contact with the housing, and the positive terminal of the battery is at the opposite end of the battery from the negative terminal. An electrolytic solution is dispersed throughout battery 10. Battery 10 can be, for example, an AA, AAA, AAAA, C, or D cylindrical battery. Alternatively, battery 10 can be a prismatic, laminar or thin battery or a coin or button cell.

Cathode 12 includes a cathode material, conductive carbon particles, a gold salt, an electrolyte solution, and, optionally, a binder. Optionally, cathode 12 can also include an oxidative additive.

The cathode material can include a nickel oxyhydroxide, such as gamma-nickel oxyhydroxide or a cobalt oxyhydroxide-modified gamma-nickel oxyhydroxide or beta-nickel oxyhydroxide or a cobalt oxyhydroxide-modified beta-nickel oxyhydroxide. The nickel oxyhydroxide can be non-fractured substantially spherical nickel oxyhydroxide particles. The nickel oxyhydroxide can be obtained by chemical oxidation, for example, by treating a nickel hydroxide with an aqueous solution of sodium or potassium peroxydisulfate, or sodium hypochlorite, or with ozone gas. The nickel oxyhydroxide can be a non-fractured, substantially spherical particle. The nickel oxyhydroxide can include a beta-nickel oxyhydroxide, a cobalt oxyhydroxide-modified beta-nickel oxyhydroxide, a gamma-nickel oxyhydroxide or a cobalt oxyhydroxide-modified gamma-nickel oxyhydroxide.

The gamma-nickel oxyhydroxide can be prepared by oxidizing (e.g., by ozonation) alpha-nickel hydroxide. See, for example, U.S. Pat. No. 6,492,062, which is incorporated by reference in its entirety. Gamma-nickel oxyhydroxide that is prepared by oxidation of beta-nickel hydroxide can experience relatively large crystallographic expansion, which results in fragmentation of the resultant gamma-nickel oxyhydroxide particles. Fragmentation of the particles can increase the interfacial area of the gamma-nickel oxyhydroxide electrode in contact with the electrolyte, resulting in increased oxidation of water in the electrolyte and a significant capacity loss upon storage. When alpha-nickel hydroxide is used as the precursor, the crystallographic lattice expansion is minimal and the degree of fracturing can be significantly reduced, which in turn, can lower the extent of self-discharge because of a decrease in the cathode interfacial area in contact with the electrolyte. See, for example, U.S. Pat. No. 6,492,062.

The cobalt oxyhydroxide-modified nickel oxyhydroxide can include a coating of a cobalt oxyhydroxide on a nickel oxyhydroxide particle. The coating can be substantially uniform. The coating can include between 2% and 10% cobalt hydroxide by weight. The cobalt oxyhydroxide can improve electrical contact between particles in the cathode and can protect the surface of the nickel oxyhydroxide from reduction by the electrolyte. The cobalt oxyhydroxide-modified nickel oxyhydroxide can be prepared by chemical or electrochemical oxidation of cobalt hydroxide-coated nickel hydroxide (e.g., by coating a layer of cobalt hydroxide onto the surface of the nickel hydroxide particles prior to oxidation to gamma-nickel oxyhydroxide). In certain embodiments, the cathode material contains non-fractured gamma-nickel oxyhydroxide particles prepared from a cobalt hydroxide-coated alpha-nickel hydroxide precursor particles.

The cathode material can include an oxidizing additive. Such an oxidizing additive is more readily reduced than the active cathode material (e.g., nickel oxyhydroxide). The oxidizing additive can serve as a sacrificial additive in the presence of the alkaline electrolyte. Examples of oxidizing additives when the cathode material includes nickel oxyhydroxide can include NaOCl, $Na_2S_2O_8$, $K_2S_2O_8$, $KMnO_4$, $BaMnO_4$, $BaFeO_4$, $AgMnO_4$ and AgO. The oxidizing additive can be physically mixed with the other cathode components, or, alternatively, one or more of the cathode components can be treated with a solution containing the oxidizing additive. The oxidizing additive also can be generated in situ from a precursor during the chemical oxidation process. Preferably, the cathode contains 0.2 to 15 wt %, greater than 0.5 to 12 wt %, or 1 to 10 wt % of the oxidizing additive.

Cathode materials or starting materials for making the cathode materials can be obtained from H.C. Starck Gmbh & Co. (e.g., substantially spherical alpha-nickel hydroxide or cobalt hydroxide-coated spherical alpha-nickel hydroxide) and JMC Tanaka Chemical Corp., Fukui, Japan (spherical nickel hydroxide Tanaka Type Z; cobalt hydroxide-coated spherical nickel hydroxide Tanaka Type CoZD). Generally, the cathode can include, for example, between 60 wt % and 95 wt %, between 80 wt % and 90 wt %, or between 86 wt % and 88 wt % of cathode material.

The conductive carbon particles can include graphite particles. The graphite can be synthetic graphite including an expanded graphite, non-synthetic graphite, natural graphite, or a blend thereof. Suitable natural graphite particles can be obtained from, for example, Brazilian Nacional de Grafite (Itapecerica, MG Brazil, NdG MP-0702x grade) or Superior Graphite Co. (Chicago, Ill., ABG-grade). Suitable expanded graphite particles can be obtained, for example, from Chuetsu Graphite Works, Ltd. (Chuetsu grades WH-20A and WH-20AF) of Japan or Timcal America (Westlake, Ohio, KS-Grade). The cathode can include, for example, between 2 wt % and 10 wt %, between 3 wt % and 8 wt %, or between 4 wt % and 6 wt % conductive carbon particles.

The gold salt can include a gold (+3) salt. Examples of a gold salt that can be included in the cathode material include gold (+3) oxide, gold (+3) hydroxide, gold (+3) sulfide, or gold (+3) acetate. The amount of gold salt in the cathode can range from 2 ppm to 1000 ppm, from 5 ppm to 250 ppm, or from 10 ppm to 100 ppm.

The gold salt can be incorporated into the cathode by mixing an appropriate amount of dry gold salt powder thoroughly with suitable amounts of the cathode material (e.g., gamma-nickel oxyhydroxide) and the conductive carbon particles (e.g., natural or expanded graphite powder, or mixtures thereof) manually using a mortar and pestle or mechanically using a high speed blade mill under an inert atmosphere. Incorporation of high concentrations (e.g., about or greater than 1,000 ppm) of gold salt in the cathode can lead to dissolution of gold ions in the electrolyte and permeation of gold ions through the separator into the anode, that can result in deposition of metallic gold onto the zinc anode and promote undesirable hydrogen gas production.

Alternatively, a gold salt can be incorporated into the cathode by dissolving the salt in the alkaline electrolyte on the cathode side of the separator. For example, a dilute solution of gold salt dissolved in alkaline electrolyte could be used to pre-wet the cathode prior to cell assembly. A dilute aqueous solution of gold salt (e.g., gold (+3) hydroxide, gold (+3) oxide, gold (+3) sulfide, gold (+3) acetate, or mixtures thereof) can be prepared by boiling the gold salt in aqueous potassium hydroxide (e.g., 45 wt % potassium hydroxide in water) to obtain a concentration of about 0.5 mg/ml (i.e., about 500 ppm). In one example, 5 wt % (based on the total cathode weight) of the dilute gold salt solution can be used to wet an admixture of gamma-nickel oxyhydroxide and graphite particles and provides a total cathode content of about 13–15 ppm gold salt. Care should be taken when making the gold salt-containing solution since the gold solutions can be prone to photoreduction, resulting in production of metallic gold particles. Photoreduction can be minimized or avoided by protecting the dilute gold salt-containing solution from light (e.g., by storing the solutions in dark or opaque bottles).

Alternatively, a gold salt can be incorporated into the cathode by first adding the salt to the nickel hydroxide powder prior to oxidation to nickel oxyhydroxide. The gold salt can be added to the alpha-nickel hydroxide as dry powders or dissolved in the alkaline electrolyte on the cathode side of the separator sheet.

Other additives can be added to the cathode. For example, other additives such as $TeO_2$, CaS, $Bi_2O_3$, or a thulium salt (e.g., thulium (+3) oxide, $Tm_2O_3$, or thulium (+3) sulfate, $Tm_2(SO_4)_3$) can be added to stabilize nickel oxyhydroxide cathodes. Other cathode additives can include zinc oxide, calcium fluoride, calcium hydroxide, yttrium oxide, cobalt metal powder, or other metal salts such as NiO, $MnO_2$, $Zn(OH)_2$, CaO, $Ca(OH)_2$, $CaSO_4$, MgO, $Mg(OH)_2$, $MgSO_4$, $Ba(OH)_2$, $BaSO_4$, $Sr(OH)_2$, $Yb_2O_3$, $Y(OH)_3$, $Er_2O_3$, $In_2O_3$, $Sb_2O_3$, $TiO_2$ (anatase or rutile), $BaTiO_3$, $CaTiO_3$, $Gd_2O_3$, $Sm_2O_3$, $CeO_2$, CdO, $Ag_2O$, BaO, $CaWO_4$, $CaSi_2O_5$, or $SrTio_3$.

Examples of binders can include polyethylene, polyacrylic acid, or a fluorocarbon resin, such as PVDF or PTFE. An example of a polyethylene binder is sold under the trade name COATHYLENE HA-1681 (available from Hoescht). The cathode can include, for example, between 0.1 wt % and 4 wt %, or between 0.5 wt % and 2 wt % binder.

The electrolyte solution can be dispersed through cathode 12, and the weight percentages provided above and below are determined after addition of the electrolyte solution.

Anode 14 can be formed of any of the standard zinc materials used in battery anodes. For example, anode 14 can be a zinc slurry that can include zinc metal particles, a gelling agent, and minor amounts of additives, such as a gassing inhibitor. In addition, a portion of the electrolyte solution can be dispersed throughout the anode.

The zinc particles can be any of the zinc particles conventionally used in slurry anodes. Examples of zinc particles can include those described in U.S. Pat. No. 6,284,410, U.S. application Ser. No. 09/115,867, or U.S. Pat. No. 6,521,378, each of which is hereby incorporated by reference in its entirety. The anode can include, for example, between 60 wt % and 80 wt %, between 65 wt % and 75 wt %, or between 67 wt % and 71 wt % of zinc particles.

The electrolyte can be an aqueous solution of alkali hydroxide, such as potassium hydroxide or sodium hydroxide. The electrolyte can contain between 15 wt % and 60 wt %, between 20 wt % and 55 wt %, or between 30 wt % and 50 wt % alkali hydroxide dissolved in water. The electrolyte can contain 0 wt % to 4 wt % alkali oxide, such as zinc oxide.

Examples of a gelling agent can include a polyacrylic acid, a grafted starch material, a salt of a polyacrylic acid, a carboxymethylcellulose, a salt of a carboxymethylcellulose (e.g., sodium carboxymethylcellulose) or combinations thereof. Examples of a polyacrylic acid includes CARBOPOL 940 and 934 (available from B. F. Goodrich) and POLYGEL 4P (available from 3V), and an example of a grafted starch material includes WATERLOCK A221 or A220 (available from Grain Processing Corporation, Muscatine, Iowa). An example of a salt of a polyacrylic acid includes ALCOSORB G1 (available from Ciba Specialties). The anode can include, for example, between, between 0.05 wt % and 2 wt %, or between 0.1 wt % and 1 wt % gelling agent.

A gassing inhibitor can include an inorganic material, such as bismuth, tin, or indium. Alternatively, a gassing inhibitor can include an organic compound, such as a phosphate ester, an ionic surfactant or a nonionic surfactant. Examples of ionic surfactants are disclosed in, for example, U.S. Pat. No. 4,777,100, which is hereby incorporated by reference in its entirety.

Separator 16 can be a conventional alkaline battery separator. In some embodiments, separator 16 can be formed of two layers of non-woven, non-membrane material with one layer being disposed along a surface of the other. For example, to minimize the volume of separator 16 while providing an efficient battery, each layer of non-woven, non-membrane material can have a basic weight of about 54 grams per square meter, a thickness of about 5.4 mils when dry and a thickness of about 10 mils when wet. The layers can be substantially devoid of fillers, such as inorganic particles.

In other embodiments, separator 16 can include a layer of cellophane combined with a layer of non-woven material. The separator also can include an additional layer of non-woven material. The cellophane layer can be adjacent cathode 12 or the anode. The non-woven material can contain from 78 wt % to 82 wt % polyvinyl alcohol and from 18 wt % to 22 wt % rayon with a trace amount of a surfactant, such as non-woven material available from PDM under the tradename PA25.

Housing 18 can be a conventional housing commonly used in primary alkaline batteries, for example, nickel plated cold-rolled steel. The housing can include an inner metal wall and an outer electrically non-conductive material such as a heat shrinkable plastic. Optionally, a layer of conductive material can be disposed between the inner wall and cathode 12. The layer can be disposed along the inner surface of the inner wall, along the circumference of cathode 12, or both. The conductive layer can be formed, for example, of a carbonaceous material (e.g., colloidal graphite), such as LB1000 (Timcal), Eccocoat 257 (W. R. Grace & Co.), Electrodag 109 (Acheson Colloids Company), Electrodag EB-009 (Acheson), Electrodag 112 (Acheson) and EB0005 (Acheson). Methods of applying the conductive layer are disclosed in, for example, Canadian Patent No. 1,263,697, which is hereby incorporated by reference in its entirety. Optionally, a corrosion-resistant coating such as gold, titanium nitride or titanium oxynitride can be applied to the inner metal wall of the housing.

Current collector 28 can be made from a suitable metal, such as brass. Seal 30 can be made, for example, of a nylon.

Batteries (button cells) containing a gold salt in the cathode were prepared according to the following examples. The gravimetric or specific capacity losses of the batteries after storage at elevated temperatures (e.g., 60° C.) were tested at room temperature as described.

EXAMPLE 1

Pressed cathode disks suitable for inclusion in 635-type button cells were prepared according to the following procedure. An admixture of 1.80 g gamma-nickel oxyhydroxide, 1.05 g natural graphite (Nacional de Grafite MP-0702x) powders was intimately mixed with 0.15 g of an alkaline solution containing gold (+3) hydroxide dissolved in 45% (w/w) aqueous potassium hydroxide at a concentration of 0.5 mg/ml using a mortar and pestle or mechanically in a high speed laboratory blade mill (e.g., Waring mixer/mill) protected from air. The mixture optionally can be dried in a vacuum desiccator at room temperature. The nominal gold (+3) concentration in the dried cathode mixture was about 13 ppm.

The aqueous gold (+3) hydroxide solution was prepared by adding 0.050 g $Au(OH)_3$ (commercially available from Alfa/Aesar) with stirring to a glass Erlenmeyer flask containing 100 ml of 45% (w/w) potassium hydroxide solution and boiling for about 15 minutes until the solution was clear. After cooling solution to room temperature, sufficient water was added to compensate for the volume lost to evaporation. The gold (+3) hydroxide solution was protected from light to minimize photoreduction.

Cathode disks were prepared by pressing about 0.3 g of wet cathode mixture containing the gold (+3) hydroxide additive directly into a nickel grid welded to the bottom of the cathode can at an applied pressure of 10,000 pounds. The button cells were assembled by placing a porous separator containing a layer of cellophane combined with a layer of a non-woven polymeric material (e.g., "Duralam" or PDM "PA25") on top of the cathode and adding 2.6 g of a gelled zinc slurry containing about 60 wt % zinc alloy powder, electrolyte containing 38 wt % potassium hydroxide and about 2 wt % zinc oxide, and about 0.5 wt % of a polymeric gelling agent. The performance of the assembled button cells was evaluated at nominally high (e.g., 43 mA) and low (e.g., 3 mA) rates of discharge. Cells were tested when freshly made or after storage in an oven at 60° C. for 1, 2 or 4 weeks, corresponding to Examples 1a, 1b, 1c, and 1d, respectively. Open circuit voltage (OCV) values were measured immediately before discharge and the average values listed in Table 1. The values were averaged for 4–5 identical button cells. Specific capacities were determined after discharge to a cut-off voltage of 0.6 V for both fresh ("Initial capacity") and stored ("Stored capacity") cells. The percent capacity loss was calculated as the difference between these two values. Average specific capacities and cumulative percent capacity losses are listed in Table 2. Percent capacity loss was calculated for each test by the following equation: (1-(Storage Capacity)/(Initial Capacity))*100%.

EXAMPLE 2

In the same manner as described in Example 1, pressed cathode disks were prepared from a cathode mixture containing 1.80 g gamma-nickel oxyhydroxide, 1.05 g natural graphite (Nacional de Grafite MP-0702x) powders, and 0.15 g of an alkaline solution containing gold (+3) oxide (Alfa/Aesar) dissolved in 45% (w/w) aqueous potassium hydroxide at a concentration of 0.5 mg/ml. The gamma-nickel oxyhydroxide, graphite, and the gold (+3) oxide-containing solution were intimately mixed using a mortar and pestle or mechanically in a high speed laboratory blade mill (e.g., Waring mixer/mill). The gold (+3) oxide solution was prepared in the same manner as the gold (+3) hydroxide solution described in Example 1. The nominal gold (+3) concentration in the dried cathode mixture was about 15 ppm. Cathodes were prepared by pressing about 0.3 g of wet cathode mixture containing the gold (+3) oxide additive directly into each can. OCV values were measured immediately before discharge and average values are listed in Table 1. The cells were tested at nominally high (e.g., 43 mA) and low (e.g., 3 mA) rates of discharge when freshly made or after storage in an oven at 60° C. for 1, 2 or 4 weeks storage, corresponding to Examples 2a, 2b, 2c, and 2d, respectively. Average specific capacities and cumulative percent capacity losses are listed in Table 2.

EXAMPLE 3

In the same manner as described in Example 1, pressed cathode disks were prepared from a cathode mixture containing 1.80 g gamma-nickel oxyhydroxide, 1.05 g natural graphite (Nacional de Grafite MP-0702x) powders, and 0.15 g of a basic solution containing gold (+3) sulfide (Alfa/Aesar) dissolved in 45% (w/w) aqueous potassium hydroxide at a concentration of 0.5 mg/ml. The gamma-nickel oxyhydroxide, graphite, and the gold (+3) sulfide-containing solution were intimately mixed using a mortar and pestle or mechanically in a high speed laboratory blade mill (e.g., Waring mixer/mill). The gold (+3) sulfide solution was prepared in the same manner as the gold (+3) hydroxide solution described in Example 1. The nominal gold (+3) concentration in the dried cathode mixture was about 13 ppm. Cathodes were prepared by pressing about 0.3 g of wet cathode mixture containing the gold (+3) sulfide additive directly into each can. OCV values were measured immediately before discharge and are average values listed in Table 1 below. The cells were tested at nominally high (e.g., 43 mA) and low (e.g., 3 mA) rates of discharge when freshly made or after storage in an oven at 60° C. for 1, 2 or 4 weeks storage, corresponding to Examples 3a, 3b, 3c, and 3d, respectively. Average specific capacities and cumulative percent capacity losses are listed in Table 2.

COMPARATIVE EXAMPLE 1

Cathode disks were prepared from an admixture containing 1.80 g gamma-nickel oxyhydroxide, 1.05 g natural graphite (Nacional de Grafite MP-0702x) powders, and 0.15 g of electrolyte solution containing 38 wt % potassium hydroxide and about 2 wt % zinc oxide. The gamma-nickel oxyhydroxide, graphite, and zinc oxide-containing electrolyte solution were intimately mixed using a mortar and pestle or mechanically in a high speed laboratory blade mill (e.g., Waring mixer/mill). Cathodes were prepared by pressing about 0.3 g of the wet cathode mixture directly into each can as described in Example 1. The cathodes did not contain a gold salt. OCV values were measured immediately before discharge and average values are listed in Table 1. The button cells were tested at nominally high (e.g., 43 mA) and low (e.g., 3 mA) rates of discharge when freshly made or after storage in an oven at 60° C. for 1, 2 or 4 weeks storage, corresponding to Comparative Examples 1a, 1b, 1c, and 1d, respectively. Average specific capacities and cumulative capacity losses are listed in Table 2.

COMPARATIVE EXAMPLE 2

Cathode disks were prepared from an admixture of 2.70 g gamma-nickel oxyhydroxide, 1.575 g natural graphite (Nacional de Grafite MP-0702x), and 0.0135 g of gold (+3) hydroxide (Alfa/Aesar) powders that were intimately mixed with 0.225 g of an aqueous electrolyte solution containing 38 wt % potassium hydroxide and about 2 wt % zinc oxide using a mortar and pestle or mechanically in a high speed laboratory blade mill (e.g., Waring mixer/mill). Cathode disks were prepared by pressing about 0.3 g of the wet cathode mixture containing the gold (+3) hydroxide additive directly into each can as described in Example 1. The cathodes contained about 5000 ppm gold (+3) salt. OCV of the freshly prepared cells measured immediately before discharge gave an average value of 1.793 V. OCV of cells after storage for 1 week in an oven at 60° C. measured immediately before discharge at room temperature gave an average value of 1.68 V. The cells were tested at nominally high (e.g., 43 mA) and low (e.g., 3 mA) rates of discharge when freshly made or after storage in an oven at 60° C. for 1 week, corresponding to Comparative Examples 2a and 2b, respectively. Cumulative capacity loss was about 25% for low rate. Nearly all the remaining cells burst before the end of 2 weeks storage at 60° C.

COMPARATIVE EXAMPLE 3

Cathode disks were prepared from an admixture of 2.646 g gamma-nickel oxyhydroxide, 1.575 g natural graphite (Nacional de Grafite MP-0702x), and 0.054 g of gold (+3) hydroxide (Alfa/Aesar) powders that was intimately mixed with 0.225 g of an aqueous electrolyte solution containing 38 wt % potassium hydroxide and about 2 wt % zinc oxide. The gamma-nickel oxyhydroxide, graphite, and the electrolyte solution were intimately mixed using a mortar and pestle or mechanically in a high speed laboratory blade mill (e.g., Waring mixer/mill). Cathode disks were prepared by pressing about 0.3 g of the wet cathode mixture containing the gold (+3) hydroxide additive directly into each can as described in Example 1. OCV of the freshly prepared cells measured immediately before discharge gave an average value of 1.797 V. Only the freshly prepared cells could be tested at nominally high (e.g., 43 mA) and low (e.g., 3 mA) rates of discharge, corresponding to Comparative Example 3a. All of the cells placed in the oven at 60° C. vented within one hour.

EXAMPLE 4

In the same manner as described in Example 1, pressed cathode disks were prepared from a cathode mixture containing 1.80 g gamma-nickel oxyhydroxide, 1.05 g natural graphite (Nacional de Grafite MP-0702x) powder, and 0.15 g of an alkaline solution containing gold (+3) hydroxide (Alfa/Aesar) dissolved in 45 wt % aqueous potassium hydroxide at a nominal concentration 1 mg/ml. The gamma-nickel oxyhydroxide, graphite, and the gold (+3) hydroxide solution were mixed intimately by hand using a mortar and pestle or mechanically in a high speed laboratory blade mill (e.g., Waring mixer/mill). The gold (+3) hydroxide solution was prepared as in Example 1. The nominal gold (+3) concentration in the dried cathode was about 26 ppm. Cathodes were prepared by pressing about 0.3 g of wet cathode mix containing the gold (+3) hydroxide directly into the cathode can as in Example 1. OCV values were measured immediately before discharge and average values are given in Table 1. The cells were tested at nominally high (e.g., 43 mA) and low (e.g., 3 mA) rates of discharge when freshly made or after storage in an oven at 60° C. for 1, 2 or 4 weeks storage, corresponding to Examples 4a, 4b, 4c, and 4d, respectively. Average values for specific capacities and cumulative percent capacity losses are given in Table 2.

EXAMPLE 5

In the same manner as described in Example 1, pressed cathode disks were prepared from a cathode mixture containing 1.80 g gamma-nickel oxyhydroxide, 1.05 g natural graphite (Nacional de Grafite MP-0702x) powder, and 0.15 g of an alkaline solution containing gold (+3) oxide (Alfa/Aesar) dissolved in 45 wt % aqueous potassium hydroxide at a nominal concentration 1 mg/ml. The gamma-nickel oxyhydroxide, graphite, and the gold (+3) oxide solution were mixed intimately by hand using a mortar and pestle or mechanically in a high speed laboratory blade mill (e.g., Waring mixer/mill). The gold (+3) oxide solution was prepared as in Example 1. The nominal gold (+3) concentration in the dried cathode was about 25 ppm. Cathodes were prepared by pressing about 0.3 g of wet cathode mix containing the gold (+3) oxide directly into the cathode can as in Example 1. OCV values were measured immediately before discharge and average values are given in Table 1. The cells were tested at nominally high (e.g., 43 mA) and low (e.g., 3 mA) rates of discharge when freshly made or after storage in an oven at 60° C. for 1, 2 or 4 weeks storage, corresponding to Examples 5a, 5b, 5c, and 5d, respectively. Average values for specific capacities and cumulative percent capacity losses are given in Table 2.

EXAMPLE 6

In the same manner as described in Example 1, pressed cathode disks were prepared from a cathode mixture containing 1.80 g gamma-nickel oxyhydroxide, 1.05 g natural graphite (Nacional de Grafite MP-0702x) powder, and 0.15 g of an alkaline solution containing gold (+3) sulfide (Alfa/Aesar) dissolved in 45 wt % aqueous potassium hydroxide at a nominal concentration 1 mg/ml. The gamma-nickel oxyhydroxide, graphite, and the gold (+3) sulfide solution were mixed intimately by hand using a mortar and pestle or mechanically in a high speed laboratory blade mill (e.g., Waring mixer/mill). The gold (+3) sulfide solution was prepared as in Example 1. The nominal gold (+3) concentration in the dried cathode was about 30 ppm. Cathodes were prepared by pressing about 0.3 g of wet cathode mix containing the gold (+3) hydroxide directly into the cathode can as in Example 1. OCV values were measured immediately before discharge and average values are given in Table 1. The cells were tested at nominally high (e.g., 43 mA) and low (e.g., 3 mA) rates of discharge when freshly made or after storage in an oven at 60° C. for 1, 2 or 4 weeks storage, corresponding to Examples 6a, 6b, 6c, and 6d, respectively. Average values for specific capacities and cumulative percent capacity losses are given in Table 2.

COMPARATIVE EXAMPLE 4

In the same manner as described in Example 1, pressed cathode disks were prepared from a cathode mixture containing 1.80 g gamma-nickel oxyhydroxide, 1.05 g natural graphite (Nacional de Grafite MP-0702x) powder, and 0.15 g of an alkaline solution containing gold (+3) hydroxide (Alfa/Aesar) dissolved in 45 wt % aqueous potassium hydroxide at a nominal concentration 0.25 mg/ml. The gamma-nickel oxyhydroxide, graphite, and the gold (+3) hydroxide solution were mixed intimately by hand using a mortar and pestle or mechanically in a high speed laboratory blade mill (e.g., Waring mixer/mill). The gold (+3) hydroxide solution was prepared as in Example 1. The nominal gold (+3) concentration in the dried cathode was about 6 ppm. Cathodes were prepared by pressing about 0.3 g of wet cathode mix containing the gold (+3) hydroxide directly into the cathode can as in Example 1. OCV values were measured immediately before discharge and average values are given in Table 1. The cells were tested at nominally high (e.g., 43 mA) and low (e.g., 3 mA) rates of discharge when freshly made or after storage in an oven at 60° C. for 1, 2 or 4 weeks storage, corresponding to Comparative Examples 4a, 4b, 4c, and 4d, respectively. Average values for specific capacities and cumulative percent capacity losses are given in Table 2.

COMPARATIVE EXAMPLE 5

In the same manner as described in Example 1, pressed cathode disks were prepared from a cathode mixture containing 1.80 g gamma-nickel oxyhydroxide, 1.05 g natural graphite (Nacional de Grafite MP-0702x) powder, and 0.15 g of an alkaline solution containing gold (+3) oxide (Alfa/Aesar) dissolved in 45 wt % aqueous potassium hydroxide at a nominal concentration 0.25 mg/ml. The gamma-nickel oxyhydroxide, graphite, and the gold (+3) oxide solution were mixed intimately by hand using a mortar and pestle or mechanically in a high speed laboratory blade mill (e.g., Waring mixer/mill). The gold (+3) oxide solution was prepared as in Example 1. The nominal gold (+3) concentration in the dried cathode was about 6 ppm. Cathodes were prepared by pressing about 0.3 g of wet cathode mix containing the gold (+3) oxide directly into the cathode can as in Example 1. OCV values were measured immediately before discharge and average values are given in Table 1.

The cells were tested at nominally high (e.g., 43 mA) and low (e.g., 3 mA) rates of discharge when freshly made or after storage in an oven at 60° C. for 1, 2 or 4 weeks storage, corresponding to Comparative Examples 5a, 5b, 5c, and 5d, respectively. Average values for specific capacities and cumulative percent capacity losses are given in Table 2.

COMPARATIVE EXAMPLE 6

In the same manner as described in Example 1, pressed cathode disks were prepared from a cathode mixture containing 1.80 g gamma-nickel oxyhydroxide, 1.05 g natural graphite (Nacional de Grafite MP-0702x) powder, and 0.15 g of an alkaline solution containing gold (+3) sulfide (Alfa/Aesar) dissolved in 45 wt % aqueous potassium hydroxide at a nominal concentration 0.25 mg/ml. The gamma-nickel oxyhydroxide, graphite, and the gold (+3) sulfide solution were mixed intimately by hand using a mortar and pestle or mechanically in a high speed laboratory blade mill (e.g., Waring mixer/mill). The gold (+3) sulfide solution was prepared as in Example 1. The nominal gold (+3) concentration in the dried cathode was about 8 ppm. Cathodes were prepared by pressing about 0.3 g of wet cathode mix containing the gold (+3) hydroxide directly into the cathode can as in Example 1. OCV values were measured immediately before discharge and average values are given in Table 1. The cells were tested at nominally high (e.g., 43 mA) and low (e.g., 3 mA) rates of discharge when freshly made or after storage in an oven at 60° C. for 1, 2 or 4 weeks storage, corresponding to Examples 4a, 4b, 4c, and 4d, respectively. Average values for specific capacities and cumulative percent capacity losses are given in Table 2.

Tables 1 and 2

OCV values for the button cells described in Examples 1–6 and Comparative Examples 1 and 4–6 were measured immediately before discharge freshly prepared and after 1, 2 and 4 weeks of storage at 60° C., with the average values given in Table 1 below. Specific capacities were determined after discharge to a cut-off voltage of about 0.6 V for both fresh ("Initial capacity") and stored ("Stored capacity") cells. The specific capacities and cumulative capacity losses for button cells containing gamma-nickel oxyhydroxide cathodes pre-wet with various gold (+3) salts stored for 1, 2, and 4 weeks at 60° C. are summarized in Table 2. The reported results are based on the averaged values for 4 to 5 test cells for each specified test condition.

TABLE 1

| Example No. | Average OCV Fresh | Average OCV after 1 wk @ 60 C. | Average OCV after 2 wks @ 60° C. | Average OCV after 4 wks @ 60° C. |
|---|---|---|---|---|
| C1a–d | 1.816 | 1.682 | 1.680 | 1.674 |
| 1a–d | 1.774 | 1.684 | 1.682 | 1.674 |
| 2a–d | 1.771 | 1.683 | 1.681 | 1.676 |
| 3a–d | 1.789 | 1.683 | 1.681 | 1.676 |
| 4a–d | 1.768 | 1.677 | 1.673 | 1.671 |
| 5a–d | 1.754 | 1.675 | 1.674 | 1.670 |
| 6a–d | 1.780 | 1.676 | 1.676 | 1.674 |
| C4a–d | 1.773 | 1.683 | 1.680 | 1.673 |
| C5a–d | 1.767 | 1.685 | 1.682 | 1.676 |
| C6a–d | 1.773 | 1.685 | 1.682 | 1.675 |

TABLE 2

| Example No. | Storage @ 60° C. (weeks) | Capacity @ 43 mA (mAhr/g) | Cumulative Capacity Loss (%) | Capacity @ 3 mA (mAhr/g) | Cumulative Capacity Loss (%) |
|---|---|---|---|---|---|
| C1a | 0 | 224 | — | 281 | — |
| C1b | 1 | 208 | 7 | 233 | 17 |
| C1c | 2 | 194 | 13 | 219 | 22 |
| C1d | 4 | 172 | 23 | 197 | 30 |
| 1a | 0 | 228 | — | 282 | — |
| 1b | 1 | 219 | 4 | 248 | 12 |
| 1c | 2 | 210 | 8 | 233 | 18 |
| 1d | 4 | 188 | 18 | 209 | 27 |
| 2a | 0 | 218 | — | 283 | — |
| 2b | 1 | 216 | 1 | 242 | 14 |
| 2c | 2 | 209 | 4 | 234 | 17 |
| 2d | 4 | 187 | 14 | 209 | 26 |
| 3a | 0 | 227 | — | 287 | — |
| 3b | 1 | 216 | 5 | 242 | 16 |
| 3c | 2 | 210 | 8 | 237 | 18 |
| 3d | 4 | 194 | 15 | 213 | 26 |
| 4a | 0 | 224 | — | 282 | — |
| 4b | 1 | 220 | 2 | 240 | 15 |
| 4c | 2 | 208 | 7 | 223 | 21 |
| 4d | 4 | 186 | 17 | 200 | 29 |
| 5a | 0 | 225 | — | 283 | — |
| 5b | 1 | 211 | 6 | 238 | 16 |
| 5c | 2 | 200 | 11 | 226 | 20 |
| 5d | 4 | 182 | 19 | 209 | 27 |
| 6a | 0 | 217 | — | 287 | — |
| 6b | 1 | 210 | 3 | 242 | 16 |
| 6c | 2 | 204 | 6 | 227 | 21 |
| 6d | 4 | 187 | 14 | 207 | 28 |
| C4a | 0 | 235 | — | 272 | — |
| C4b | 1 | 189 | 20 | 230 | 22 |
| C4c | 2 | 174 | 26 | 192 | 29 |
| C4d | 4 | 164 | 30 | 180 | 34 |
| C5a | 0 | 235 | — | 270 | — |
| C5b | 1 | 203 | 13 | 227 | 16 |
| C5c | 2 | 189 | 19 | 211 | 22 |
| C5d | 4 | 169 | 28 | 178 | 34 |
| C6a | 0 | 232 | — | 269 | — |
| C6b | 1 | 200 | 14 | 226 | 16 |
| C6c | 2 | 192 | 17 | 209 | 23 |
| C6d | 4 | 174 | 25 | 179 | 34 |

The average OCV values for the cells with cathodes containing various gold (+3) salts and control cells without gold (+3) salt additives are given in Table 1. The OCV values for fresh cells were typically substantially higher (about 100 mV) than for those stored for 1, 2 or 4 weeks at 60° C. With the exception of the fresh cells, there was very little variation in OCV (i.e., <10 mV) either as a function of gold (+3) salt type or length of storage at 60° C. Results obtained after 2 and 4 weeks storage at 60° C. suggest that OCV values are substantially lower for cells with cathodes containing higher concentrations of gold (+3) salt (i.e., Examples 4c–d, 5c–d, and 6c–d) compared to identical cells not containing any gold (+3) salt.

Figure 2:
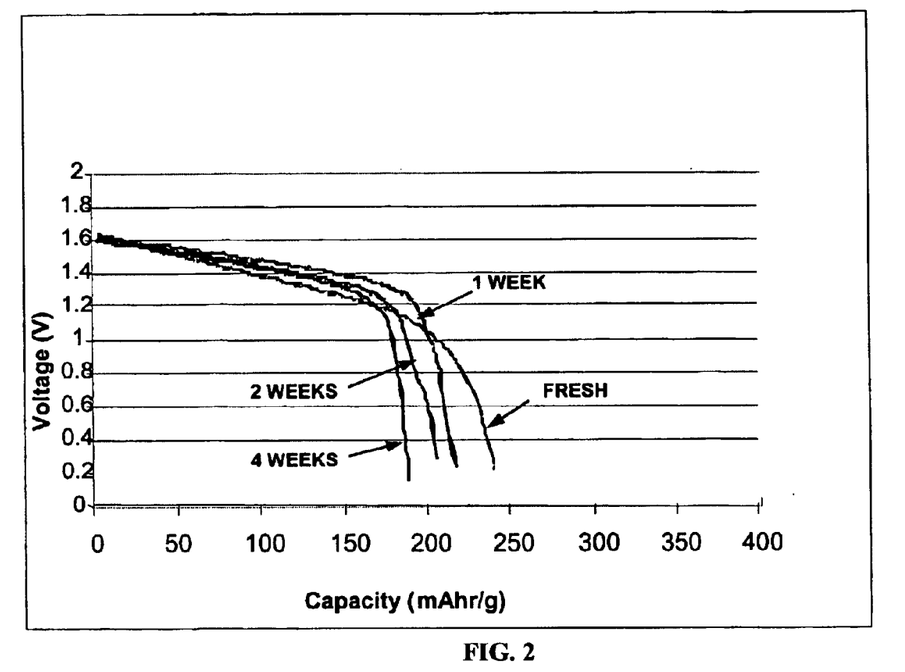
FIG. 2 is a graph depicting discharge curves for button cells with cathodes containing gamma-nickel oxyhydroxide, natural graphite, and gold (+3) oxide discharged at low rate (i.e., 3 mA) fresh and after storage for 1, 2, and 4 weeks.

FIG. 2 depicts a graphical comparison of discharge curves for button cells with cathodes containing unfractured, substantially spherical gamma-nickel oxyhydroxide, natural graphite, and gold (+3) oxide discharged at low rate (i.e., 3 mA) fresh and after storage for 1, 2, and 4 weeks.

Figure 3:
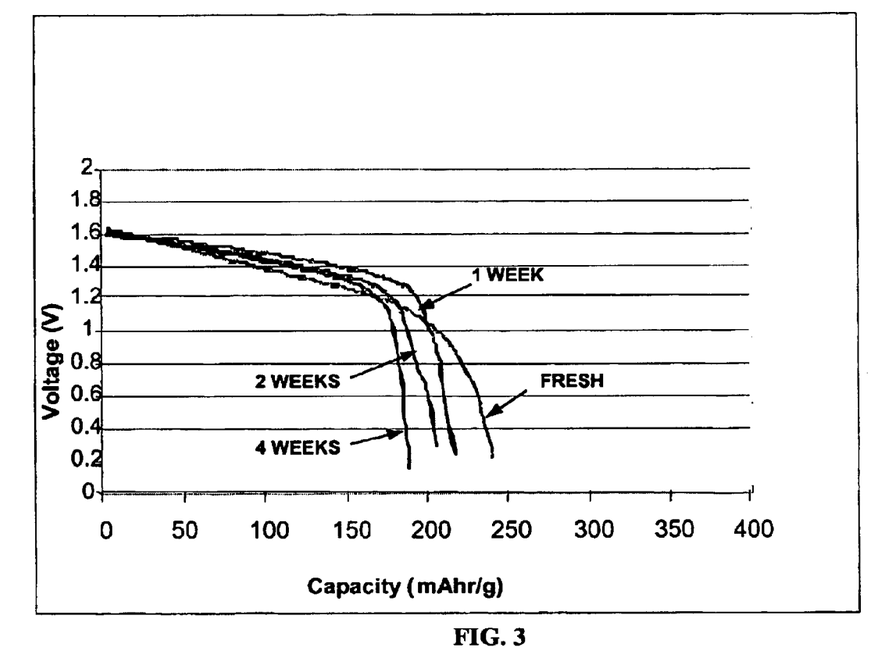
FIG. 3 is a graph depicting discharge curves for button cells with cathodes containing unfractured, substantially spherical gamma-nickel oxyhydroxide, natural graphite, and gold (+3) oxide discharged at high rate (i.e., 43 mA) fresh and after storage for 1, 2, and 4 weeks.

FIG. 3 depicts a graphical comparison of discharge curves for button cells with cathodes containing unfractured, substantially spherical gamma-nickel oxyhydroxide, natural graphite, and gold (+3) oxide discharged at high rate (i.e., 43 mA) fresh and after storage for 1, 2, and 4 weeks.

Summarizing the results given in Table 2, the relative capacity loss for batteries described in Examples 1–6 after 1 week storage at 60° C. were decreased by about 5 to 30% for low-rate (i.e., 3 mA) and about 15 to 85% for high-rate (i.e., 43 mA) discharge compared to identical button cells having cathodes prepared from the same gamma-nickel oxyhydroxide pre-wetted with 5 wt % of 38% potassium hydroxide electrolyte without the gold (+3) salt (i.e., "control" cells, see Comparative Example 1). Similarly, the cumulative capacity loss for batteries described in Examples 1–6 after 2 weeks storage at 60° C. were decreased by about 5 to 25% for low-rate and about 35 to 70% for high-rate discharge. Finally, the cumulative capacity loss for batteries described in Examples 1–6 after 4 weeks storage at 60° C. were decreased by about 10% for low-rate and 20–40% for high-rate discharge. The addition of about 15 ppm gold (+3) oxide to cathodes containing gamma-nickel oxyhydroxide gave a high-rate cumulative capacity loss after 4 weeks at 60° C. that is nearly 40% less than the result disclosed in U.S. application Ser. No. 09/633,067 for cells with cathodes containing gamma-nickel oxyhydroxide prepared from the same cobalt hydroxide-coated alpha-nickel hydroxide without any gold (+3) salt. Furthermore, cumulative capacity loss values at high discharge rates for cells with a cathode containing nickel oxyhydroxide and greater than about 15 ppm gold (+3) but less than about 100 ppm gold (+3) stored for 4 weeks at 60° C. are lower than cumulative capacity loss values for cells with cathodes containing beta-nickel oxyhydroxide treated with an alkaline hydroxide solution and stored for about 3 weeks at 60° C. before discharge.

Other embodiments are within the claims.

What is claimed is:

1. An alkaline battery comprising:
    a cathode comprising nickel oxyhydroxide and a gold salt;
    an anode comprising zinc;
    a separator between the anode and the cathode; and
    an alkaline electrolyte.
2. The battery of claim 1, wherein the nickel oxyhydroxide includes beta-nickel oxyhydroxide.
3. The battery of claim 1, wherein the nickel oxyhydroxide includes gamma-nickel oxyhydroxide.
4. The battery of claim 1, wherein the nickel oxyhydroxide includes a mixture of beta-nickel oxyhydroxide and gamma-nickel oxyhydroxide.
5. The battery of claim 1, wherein the nickel oxyhydroxide includes unfractured, substantially spherical particles.
6. The battery of claim 5, wherein the gold salt is selected from the group consisting of gold (+3) oxide, gold (+3) sulfide, gold (+3) hydroxide, and gold (+3) acetate.
7. The battery of claim 6, wherein the cathode includes between 5 ppm and 1000 ppm of the gold salt.
8. The battery of claim 6, wherein the cathode includes between 10 ppm and 200 ppm of the gold salt.
9. The battery of claim 6, wherein the cathode includes between 15 ppm and 100 ppm of the gold salt.
10. The battery of claim 6, wherein the anode includes a gelling agent.
11. The battery of claim 1, wherein the nickel oxyhydroxide is cobalt oxyhydroxide-modified nickel oxyhydroxide.
12. The battery of claim 11, wherein the cobalt oxyhydroxide-modified nickel oxyhydroxide has a coating of a cobalt oxyhydroxide on a surface of a nickel oxyhydroxide.
13. The battery of claim 12, wherein the coating is substantially uniform.
14. The battery of claim 11, wherein the cobalt oxyhydroxide-modified nickel oxyhydroxide is derived from nickel hydroxide coated with between 2% and 10% cobalt hydroxide by weight.
15. The battery of claim 11, wherein the cobalt oxyhydroxide-modified nickel oxyhydroxide is derived from alpha-nickel hydroxide.
16. The battery of claim 11, wherein the cobalt oxyhydroxide-modified nickel oxyhydroxide is derived from beta-nickel hydroxide.
17. The battery of claim 11, wherein the gold (+3) salt is selected from the group consisting of gold (+3) oxide, gold (+3) sulfide, gold (+3) hydroxide, and gold (+3) acetate.
18. The battery of claim 17, wherein the anode includes a gelling agent.
19. The battery of claim 1, wherein the nickel oxyhydroxide is derived from alpha-nickel hydroxide.
20. The battery of claim 1, wherein the nickel oxyhydroxide includes a dopant including aluminum, cobalt, manganese or silver.
21. The battery of claim 1, wherein the cathode includes less than about 1,000 ppm of the gold (+3) salt.
22. The battery of claim 1, wherein the cathode includes between 5 ppm and 500 ppm of the gold salt.
23. The battery of claim 1, wherein the cathode includes between 10 ppm and 200 ppm of the gold salt.
24. The battery of claim 1, wherein the cathode includes NaOCl, $K_2S_2O_8$, $Na_2S_2O_8$, $KMnO_4$, $BaMnO_4$, $BaFeO_4$, $AgMnO_4$, or AgO.
25. The battery of claim 1, further comprising $TeO_2$, CaS, or $Bi_2O_3$.
26. The battery of claim 1, further comprising zinc oxide, calcium fluoride, NiO, $MnO_2$, $Zn(OH)_2$, CaO, $Ca(OH)_2$, $CaSO_4$, MgO, $Mg(OH)_2$, $MgSO_4$, $Ba(OH)_2$, $BaSO_4$, $Sr(OH)_2$, $Yb_2O_3$, $Y(OH)_3$, $Er_2O_3$, $In_2O_3$, $Sb_2O_3$, $TiO_2$, $BaTiO_3$, $CaTiO_3$, $Gd_2O_3$, $Sm_2O_3$, $CeO_2$, CdO, $Ag_2O$, BaO, $CaWO_4$, $CaSi_2O_5$, or $SrTiO_3$.
27. The battery of claim 1, wherein the battery is a primary battery.
28. The battery of claim 27, further comprising a thulium salt.
29. The battery of claim 28, wherein the thulium salt includes thulium (3+) oxide or thulium (3+) sulfate.
30. The battery of claim 27, wherein the capacity loss is less than 40% after storing the battery at 60° C. for 4 weeks.
31. The battery of claim 27, wherein the capacity loss is less than 30% after storing the battery at 60° C. for 4 weeks.
32. The battery of claim 27, wherein the capacity loss is less than 10% after storing the battery at 60° C. for 4 weeks.
33. The battery of claim 1, wherein the cathode includes a conductive carbon.
34. A primary alkaline battery comprising:
    a cathode comprising nickel oxyhydroxide and a gold salt selected from the group consisting of gold (+3) oxide, gold (+3) sulfide, gold (+3) hydroxide, and gold (+3) acetate;
    an anode comprising zinc;
    a separator between the anode and the cathode; and
    an alkaline electrolyte.
35. The battery of claim 34, wherein the nickel oxyhydroxide includes beta-nickel oxyhydroxide.
36. The battery of claim 34, wherein the nickel oxyhydroxide includes gamma-nickel oxyhydroxide.
37. The battery of claim 34, wherein the nickel oxyhydroxide includes a mixture of beta-nickel oxyhydroxide and gamma-nickel oxyhydroxide.
38. The battery of claim 34, wherein the nickel oxyhydroxide includes unfractured, substantially spherical particles.
39. The battery of claim 34, wherein the cathode includes between 5 ppm and 500 ppm of the gold salt.
40. A method of manufacturing an alkaline battery, comprising:

obtaining a cathode mixture comprising nickel oxyhydroxide, a gold salt, and an alkaline electrolyte; and assembling a cathode containing the cathode mixture, an anode comprising zinc, and a separator between the cathode and the anode to form the alkaline battery.

41. The method of claim 40, further comprising mixing an aqueous alkaline solution containing the alkaline electrolyte and a gold salt with nickel oxyhydroxide to form the cathode mixture.

42. The method of claim 40, wherein the nickel oxyhydroxide includes gamma-nickel oxyhydroxide, beta-nickel oxyhydroxide or mixtures thereof.

43. The method of claim 40, wherein the nickel oxyhydroxide includes a nickel oxyhydroxide cobalt oxyhydroxide modified-nickel oxyhydroxide.

44. The method of claim 40, wherein the nickel oxyhydroxide includes unfractured, substantially spherical particles.

* * * * *